Oct. 16, 1962     C. N. CROSS     3,058,401
DISPLAY MOUNT AND METHOD FOR FORMING DISPLAY APERTURES THEREIN
Filed Sept. 17, 1957     2 Sheets-Sheet 1
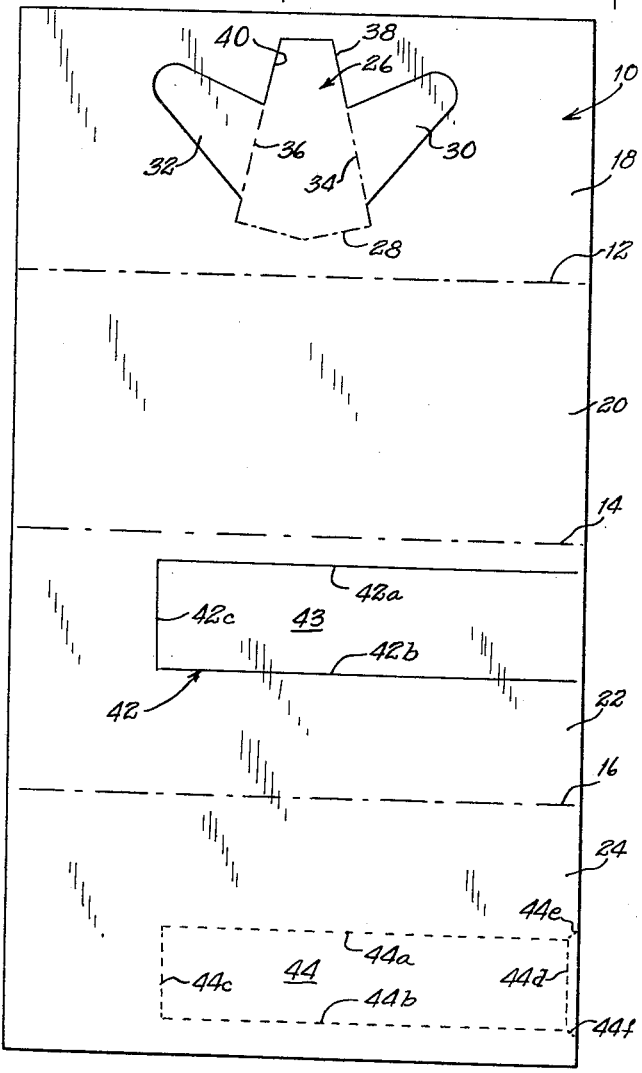
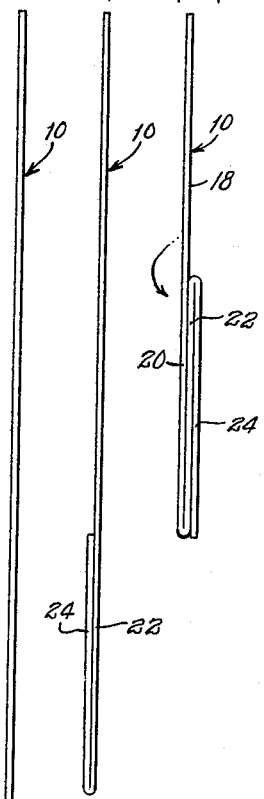
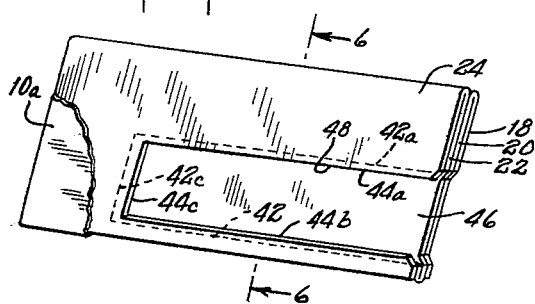
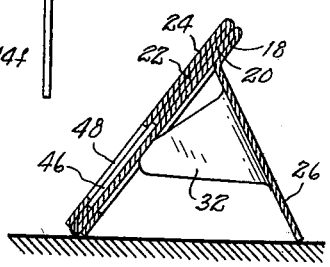
INVENTOR.
CARROLL N. CROSS
BY
ATTORNEY Oct. 16, 1962 C. N. CROSS 3,058,401
DISPLAY MOUNT AND METHOD FOR FORMING DISPLAY APERTURES THEREIN
Filed Sept. 17, 1957 2 Sheets-Sheet 2
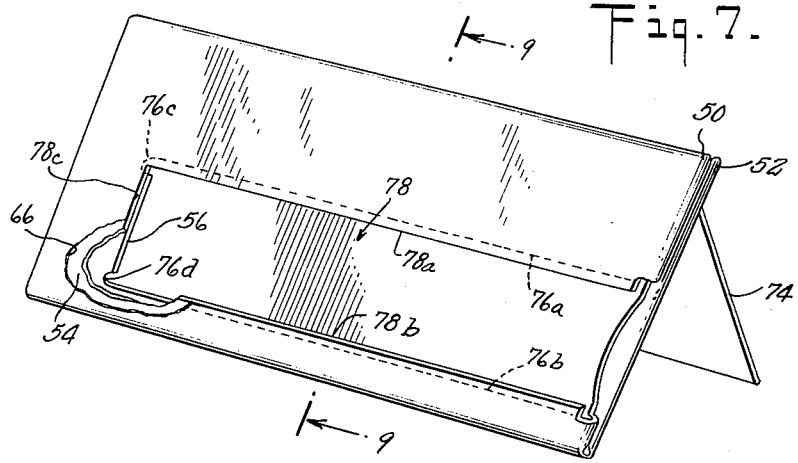
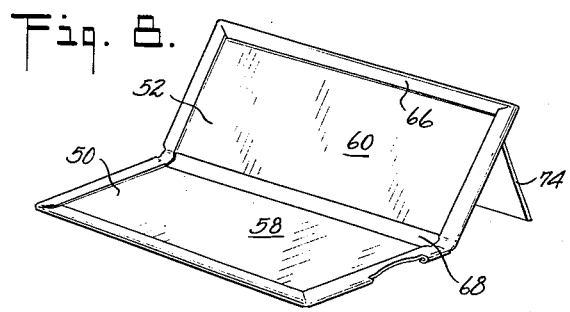
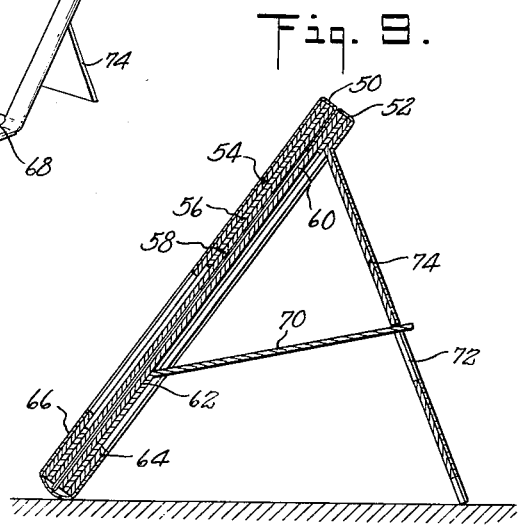
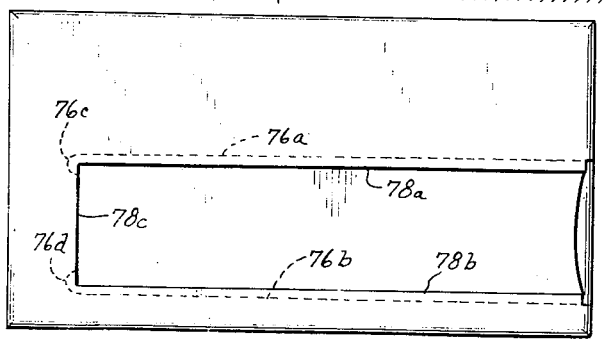
INVENTOR.
CARROLL N. CROSS
BY
ATTORNEY

United States Patent Office 3,058,401
Patented Oct. 16, 1962

3,058,401
DISPLAY MOUNT AND METHOD FOR FORMING DISPLAY APERTURES THEREIN
Carroll N. Cross, R.F.D. 2, Box 396, Maitland, Fla.
Filed Sept. 17, 1957, Ser. No. 684,533
2 Claims. (Cl. 93—1)

This invention relates to display mounts and to the method of making the same. More particularly the invention relates to display mounts and the method for forming display apertures therein.

In my United States Patent No. 2,355,706, I have disclosed a display mount having a well in the face thereof for displaying material such as calendar pads. That patent provides corner or edge restraints which cooperate with display material therein to hold such material against warping or curling. The structure of my aforesaid patent has been successful for its intended purpose, but it has not permitted insertion and removal of the display material as easily and as rapidly as might be desired. This has been true particularly when removal and reinsertion of display material is undertaken by the ultimate user such as may be required when the display material consists of a pad of month-by-month calendar sheets.

It is, therefore, the primary object of this invention to provide a display material well in a mount structure which not only provides edge or corner restraints for the display material whereby such material is kept from curling or warping, but also one in which the insertion and removal of such material is greatly facilitated.

The principal objective of the invention is achieved by forming a well in one of the boards of the mount structure which opens through one of the edges of the mount structure to provide ready access for the insertion and removal of display material.

The main objective of the invention and auxiliary features thereof will become clear as the following specification is read in light of the drawings, wherein:

FIG. 1 is a plan view of a blank from which one form of mount structure is formed;

FIG. 2 is an edge view of the blank of FIG. 1;

FIG. 3 is a view similar to FIG. 2 showing the first fold to which the blank is subjected;

FIG. 4 is a view similar to FIG. 2 showing the second fold to which the blank is subjected, and indicating also the fourth fold thereof;

FIG. 5 is a perspective face view of the completed mount with the decorative binding material on the face thereof partially removed to show underlying structure;

FIG. 6 is a sectional view on line 6—6 of FIG. 5 with the facing material removed, however, to simplify the view;

FIG. 7 is a facial perspective view of a different display mount structure embodying the invention in modified form;

FIG. 8 is a view similar to FIG. 7 wherein, however, the face panel of the mount has been swung into open position about a hinge line;

FIG. 9 is a sectional view on line 9—9 of FIG. 7; and

FIG. 10 is a face view of the mount shown in FIG. 7.

In that form of the invention shown in FIGS. 1–6, the mount is preferably formed from a single blank of material 10, such as cardboard, which is either scored or partially creased and partially cut along generally parallel transverse lines 12, 14 and 16. The sections of the blank defined by the score lines 12, 14 and 16 are adapted for folding into face-to-face contact, such that the panel 18 constitutes a backboard, the panel 20 constitutes an intermediate board, the panel 22 constitutes a well board, and the panel 24 constitutes a face board.

In its most elementary form, the invention herein contemplates the partial formation of a material display well in the well board 22 prior to the folding of the blank 10 into its ultimate form. Thus, preferably at the time the transverse score lines 12–16 are formed in the blank, there is partially severed from the well board 22 a display well 42. This display well will usually assume a rectangular form, although its shape is not necessarily limited to such form. However, since the mount will find its principal use in the display of calendar pads and like material, the form of the display well 42 has been shown as in the nature of an elongated rectangle. In partially forming the display well 42, the well board 22 is cut through along a pair of parallel lines 42a and 42b. These lines are intersected at their inner end by a perpendicular line 42c. The lines 42a and 42b, it will be noted, do not extend entirely to the outer edge of the well board 22. Thus, a piece 43, which is severed from the well board 22, is in the nature of a tongue which is still attached at its outer end to the well board 22. The described procedure of forming the cut-out in the well board results in retaining the tongue 43 temporarily in the panel 10. This is an aid to the subsequent formation of a display window as shall be described and also to the handling and folding of the panel 10 at a subsequent point in the operation.

The face board 24 is folded against the well board 22 such that the face board 24 overlies the well board 22. Thereafter, the well board 22 is folded in a direction opposite to that of the first fold and over the intermediate board 20 and finally the back board 18 is folded into face-to-face contact with the intermediate board 20.

After folding the blank 10 about the score lines 12–16, as described, the structure is maintained in unitary assembly by adhesively attaching a decorative covering material 10a (FIG. 5), such as paper leatherette, for example, to the exposed surface of the face board 24, turning such covering material about the edges of the folded panels, and adhesively securing the covering material to the exposed face of the back board 18.

The structure is now in condition for the performance of further operations particularly those relating to the formation of a display window in the face board and an edge opening for insertion of display material. Accordingly, a display window is formed in the face board 24 which is slightly smaller than the display well 42 in the well board. The difference in the respective dimensions of the display well 42 and the display window results in a display window having edges overhanging at least some of the edges of the display well.

Accordingly, the face board panel 24 only is cut along a pair of generally parallel lines 44a and 44b which lines are intersected by a perpendicular line 44c thus defining a display window area 44. It will be noted that during the described cutting operation, the display well tonge 43 constitutes a base or anvil against which the display window is cut. This greatly assists in the operation of forminging the display window and permits the formation of clean cuts through the face board by which the display window is defined.

As the cuts 44a, 44b and 44c are being made, the entire mount is cut through along a line 44d and along a pair of divergent lines 44e and 44f. The lines 44d, 44e and 44f, it will be noted, extend through the edge of the mount structure. Furthermore, the line 44d is so cut as to intersect the parallel cuts 42a and 42b which, in part, define the display well tongue 43, thereby completely severing the tongue 43 from the well board panel 22. After the incision along the lines 44d, 44e and 44f are performed, the well tongue 43 and the display window cut-out 44 can be stripped from the mount structure in a lateral direction through an open edge of the mount.

The operation of forming a mount as described above will result in the formation of a display well 46 in the well board 22 and a display window 48 in the face board 24. By reference to FIG. 5, it will be seen that the display well 46 opens through a lateral edge of the mount structure such that the insertion and removal of display material thereinto and therefrom is greatly facilitated. Furthermore, it may be seen that the edges 42a, 42b and 42c which define the display well are spaced inwardly respectively from the edges 44a, 44b and 44c, which define the display window. Consequently, when display material is inserted into the display well 46, such material being substantially the size of the display well, the edges 44a, 44b and 44c of the face board 24 will overlie the edges of the display material and thereby prevent warping and curling thereof, yet at the same time the insertion and removal of the display material is greatly facilitated by permitting insertion and removal through an open edge of the mount.

The mount is completed by forming a supporting prop structure 26 in the back board 18. The supporting prop 26 is so formed that is is adapted to swing outwardly along an angular score line 28 such that a pair of ears 30 and 32 can be rotated inwardly about score lines 34 and 36 respectively whereby the end of the ears 30 and 32 can be brought into engagement with the side walls 38 and 40 respectively, in the back board from which the supporting prop 26 is severed. The structure of the supporting prop may be generally of the character disclosed and claimed in my United States Patent No. 2,383,776.

In FIGS. 7–10 is disclosed a modified form of the invention as applied to a different type of display mount. In these FIGURES of the drawing, the mount is, in effect, a two part structure in which a face panel can be rotated about a hinge which connects it to a back panel such that the surfaces exposed upon such rotation may be utilized for purpose of memoranda such as a telephone index. In these FIGURES of the drawing, a pair of mount elements 50 and 52, constituting respectively a face element and a back element, are each formed of three pieces of cardboard stock, preferably by scoring and folding, such as described in respect to FIG. 1. Accordingly, the face element consists of a face board 54, a well board 56, and a backboard 58, and the back element consists of a face board 60, an intermediate board 62 and a backboard 64.

When the several boards of the face element 50 and the back element 52 are assembled in face-to-face relation, the face element and the back element are joined together by means which at the same time secures the several boards of the two elements into a compact unitary structure. The joining operation is preferably performed by adhesively attaching a decorative flexible lining material, such as paper leatherette 66 to the exposed surface of the face board 54 and to the exposed surface of the back board 64 while the face element 50 and the back element 52 are arranged with the lateral edges in alignment but in slightly spaced relation to each other insofar as their bottom edges are concerned. The lining material 66 is then folded about the edges of the face elements as shown in FIG. 8 and adhesively secured in this position. This results in a mount structure having a back element 52 and a face element 50 that are joined together such that the elements may rotate in respect to each other about a hinge line 68 formed by the facing material 66. When the mount is supported in display position, the face element 50 may be rotated into a horizontal position, as shown in FIG. 8, thereby exposing the area between the elements, this area preferably being covered by a memorandum sheet adhesively attached to the faces of the elements.

At the time the panels forming the back element 52 are die cut, the intermediate board 62 of the back element is cut to form therein a locking tongue 70. The locking tongue 70 is adapted to engage a recess 72 in a supporting prop 74 whereby the mount structure may be held in upright display position. The locking tongue 70 and the supporting prop 74 may conveniently be according to the supporting easel for display mounts disclosed in my United States Patent No. 2,654,554.

Before the material constituting the panels of the face element 50 is folded into its final form, a partially formed display well is cut into the well board 56 thereof. The outline of the display well formed in accordance with the modified application of the invention differs from that described in respect to FIG. 1 of the application in that a pair of substantially parallel incisions 76a and 76b, which in this case may extend through the edge of the well board 56, have their inner ends 76c and 76d inturned, such that the partially severed tongue thus formed remains joined to the well board 56 at the area between the inturned incisions 76c and 76d. In this way the partially severed tongue of the well board is retained in the assembly, such that further processing of the mount is facilitated.

After the facing material 66 has been applied, as described, the supporting prop 74 and a display window 78 are formed respectively in the back element 52 and the face element 50. The display window is formed by incisions along parallel lines 78a and 78b which extend only through the decorative covering material 66 and the face board 54. It is to be noted particularly that the cuts 78a and 78b extend through a lateral edge of the face element 50 at one end and substantially to the inner end of the cuts 76a and 76b that were preformed in the well board 56. At the time the cuts 78a and 78b are preformed, a perpendicular cut is made along the line 78c. At this point, the cut along line 78c is of such depth as not only to extend through the decorative face covering 66 and the face board 54, but also through the well board 56. The length of the cut 78c is such that it intersects the inturned portions 76e, 76d, of the previously formed well board cuts 76a and 76b, respectively. At this point, the well board 56 is severed such that the portion to be removed can be stripped from the assembly together with the portion that has been severed from the face board 54. This operation is a simple one since all that is required is the removal of the severed pieces by lateral withdrawal through the open edge of the face element.

It will be seen that the structure produced by the operation hereinabove described results in a display well and display window relationship which provides a restraint for the display material at two of its edges. This result follows from the fact that the incisions 78a and 78b made through the decorative binding material 66 and the face board 54 are spaced inwardly in relation to the corresponding incisions 76a and 76b that were formed in the well board 56. In this form of the invention it will be noted, however, that the inner edges of the well board 56 and the face board 54 coincide with each other. When display material is inserted into the well, through the open edge of the face element 50, opposite edges of the material will be embraced and restrained against warping and curling by the overhanging of the well provided by the edges 78a and 78b of the face board.

While the fundamentally novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claims.

I claim:

1. The method of forming display inserting passages along an entire edge of display wells in mount structures which comprises the steps of partially forming a display material well in a well board by cutting through said well board along a single generally U-shaped line defining the outline of said well except at the open end of said generally U-shaped line where said line terminates within a lateral edge of said well board, superimposing a face board on said well board and joining the same therewith, then forming a display window in said face board by incisions through said face board only which are inset from the cuts of said U-shaped line in said well board to form a face board overhang along said incisions, simultaneously forming incisions through said face board and said well board such that said well board and said face board are both severed at said open end of said generally U-shaped line by cuts which extend entirely through the lateral edge of both of said boards at the open end of said generally U-shaped line, and thereafter removing the severed pieces of said boards of said mount so formed to form a display well having an unrestricted display inserting passage at one edge thereof.

2. The method of forming display inserting passages along an entire edge of display wells in mount structures which comprises the steps of partially forming a display material well in a well board by severing said board along a single generally U-shaped incision extending along a pair of spaced substantially parallel lines defining opposite sides of said well and along a line connecting said substantially parallel lines at one end thereof, said substantially parallel lines extending in the direction of and terminating at their other end within one lateral edge of said board, superimposing a face board on said well board and joining the same therewith, then forming a display window in said face board by incisions through said face board only which are inset from said generally U-shaped incision in said well board to form a face board overhang along said incision, simultaneously forming incisions through said face board and said well board such that said well board and said face board are both severed entirely through the lateral edge of both said boards at the terminus of said substantially parallel lines by incisions which intersect said terminus, and thereafter removing the severed pieces of board of said mount so formed to form a display well having an unrestricted display inserting passage at one edge thereof.

References Cited in the file of this patent

UNITED STATES PATENTS

| | | |
|---|---|---|
| 1,700,050 | Henderson et al. | Jan. 22, 1929 |
| 2,355,706 | Cross | Aug. 15, 1944 |
| 2,383,776 | Cross | Aug. 28, 1945 |
| 2,496,884 | Miles | Feb. 7, 1950 |
| 2,563,357 | Nichols | Aug. 7, 1951 |